(12) United States Patent
Rainer

(10) Patent No.: US 6,306,488 B1
(45) Date of Patent: Oct. 23, 2001

(54) COMPOSITE RIGID SPONGE STRUCTURE

(76) Inventor: Norman B. Rainer, 2008 Fondulac Rd., Richmond, VA (US) 23229

( * ) Notice: Subject to any disclaimer, the term of this patent is extended or adjusted under 35 U.S.C. 154(b) by 0 days.

(21) Appl. No.: 09/527,185

(22) Filed: Mar. 17, 2000

Related U.S. Application Data
(60) Provisional application No. 60/125,087, filed on Mar. 19, 1999.

(51) Int. Cl.⁷ ........................................................ B32B 3/26
(52) U.S. Cl. .................... 428/308.4; 260/2.5 M; 260/2.5 P; 521/29; 521/25; 521/28; 521/32; 264/48; 264/109
(58) Field of Search ............................... 428/308.4, 316.6, 428/315.5; 260/2.5 M, 2.5 P; 521/29, 25, 28, 32; 264/48, 109

(56) References Cited

U.S. PATENT DOCUMENTS

| | | | |
|---|---|---|---|
| 3,674,722 | | 7/1972 | Rainer et al. . |
| 5,002,984 | * | 3/1991 | Rainer ..................................... 524/30 |
| 5,064,540 | * | 11/1991 | Rainer ................................... 210/688 |
| 5,096,946 | | 3/1992 | Rainer . |
| 5,162,404 | * | 11/1992 | Rainer ..................................... 524/30 |
| 5,169,883 | * | 12/1992 | Rainer ..................................... 524/30 |
| 5,595,652 | * | 1/1997 | Rainer ................................... 210/282 |
| 5,597,850 | * | 1/1997 | Rainer ..................................... 521/29 |

* cited by examiner

Primary Examiner—Blaine Copenheaver
Assistant Examiner—Hai Vo
(74) Attorney, Agent, or Firm—Norman B. Rainer

(57) ABSTRACT

A composite porous structure includes a macroporous open-pore sponge of regenerated cellulose having disposed within the pores a microporous polyvinyl chloride (PVC) substrate. The total empty space of the structure, produced by the pores, is between 60% and 92% of the outer envelope geometrical volume of the structure. The wet compressive strength of the structure is at least ten times greater than the wet compressive strength of the cellulose sponge without the PVC.

10 Claims, No Drawings

COMPOSITE RIGID SPONGE STRUCTURE

RELATED APPLICATIONS

This Application is based upon Provisional Application Ser. No. 60/125,087, filed 03/19/99.

BACKGROUND OF THE INVENTION

1. Field of the Invention

This invention relates to an open-celled sponge having a cellulosic component of large pore size and a polyvinylchloride component of small pore size.

2. Description of the Prior Art

In the field of pollution control, it is often sought to remove toxic organic substances from water. The organic substances may be present in dissolved or suspended form, and may be present in large amounts, or in small amounts such as in parts per million, parts per billion, or less. Exemplary toxic organic species include: polychlorinated biphenyls, dioxins, polyaromatic hydrocarbons, nitroaromatics, pesticides, herbicides, methyl t-butyl ether, and volatile halocarbons.

Current technology for removing such organic contaminants involves the use of activated carbon. However, the activated carbon, generally in granular form, must be confined within a vessel as a bed through which the water to be treated is caused to flow. The bed of carbon granules generally creates impedance to the water flow, requiring adequate pumping to achieve a sought flow rate. Also, suspended material in the in going water stream may accumulate within the bed to cause even higher flow impedance. Although activated carbon functions efficiently, its total capacity or absorbed species is low, often less than 2% of the weight of the carbon. This results in the need to handle large amounts of carbon for the removal of relatively small amounts of contaminants.

Another problem in the field of pollution control is filtration for the removal of extremely fine suspended particles. Classic filtration methods employ, for example, sand bed filters and plate and frame presses. Such equipment is of large size and considerable expense, and requires careful monitoring to assure proper performance. Filters involving a porous membrane are usually employed for removing small quantities of very fine particles that may have passed through conventional filters. The membrane filters, however, are easily clogged or "blinded" when relatively little material accumulates on the upstream surface of the membrane.

The use of a microporous form of polyvinyl chloride (PVC) in filtration applications has been disclosed in U.S. Pat. No. 3,674,722. Although the microporous PVC performs well in filtration applications, it is difficult to produce useful shaped structures from the microporous PVC because of shrinkage during molding. Also, such shaped structures have been found to be brittle. When the shaped structure involves a continuous smooth upstream filtration surface, the microporous PVC filter clogs as easily as less expensive membrane filters.

It is disclosed in said U.S. Pat. 3,674,722 at column 3, lines 41–42 that the microporous PVC can be inserted as an impregnant into porous structures such as open celled foams. It has been found however, that with most such foams, unless the PVC completely fills the pores, it tends to flake away from the foam. Such is particularly the case with rigid foams or sponges comprised of polyethylene, polyurethane, polystyrene, phenolics, metals, ceramics or glass. When the pores of the foam are completely filled with the PVC, the resultant composite structure develops a very high impedance to the passage of fluids therethrough. If the sponges become soft when immersed in water, their usefulness is diminished because of compressive effects encountered during water treatments.

It is accordingly an object of the present invention to provide a rigid sponge structure capable of absorbing organic pollutants from water.

It is another object of this invention to provide a sponge structure as in the foregoing object having relatively low impedance to the passage of fluids therethrough.

It is a further object of the present invention to provide a sponge structure of the aforesaid nature capable of filtering suspended particles out of water.

It is a still further object of this invention to provide a sponge structure of the aforesaid nature resistant to compression under hydraulic pressures encountered during water treatment.

It is yet another object of the present invention to provide a sponge structure of the aforesaid nature amenable to low cost manufacture.

These objects and other objects and advantages of the invention will be apparent from the following description.

SUMMARY OF THE INVENTION

The above and other beneficial objects and advantages are accomplished in accordance with the present invention by a composite rigid sponge structure comprising:

a) an open-pore sponge comprised of regenerated cellulose and having pores of relatively large diameter, and b) microporous polyvinyl chloride (PVC) deposited within said pores of relatively large diameter, the weight ratio of said PVC to said regenerated cellulose being between 5/1 and 1/1, c) the total volume of said pores being between 60% and 92% of the geometric volume of said structure, and d) the wet compressive strength of said structure being at least ten times greater than the wet compressive strength of said open-pore cellulose sponge without said PVC.

DESCRIPTION OF THE PREFERRED EMBODIMENT

Regenerated cellulosic sponge useful in the production of the composite sponge structure of the present invention is available from the OCelO Company of Tonawanda, N.Y. The cellulosic sponge is available in fine pore and coarse pore grades, usually in the form of slab stock of various thickness. As determined by mercury intrusion porosimeter measurement, the average pore size of the coarse pore grade is about 2 mm. and the average pore size of the fine pore grade is about 1 mm. However, there is a wide range of pore sizes within either grade of sponge, and some of the pores are too large to be measured by classic porosimeter techniques. The pore structure consists of a random array of tunnels and apertures, said array having a high degree of tortuosity.

The microporous PVC is produced substantially by the procedure of U.S. Pat. No. 3,674,722, said procedure involving forming a mixture of a colloidal dispersion of a latex of a non-film forming PVC with a water-soluble organic non-solvent for the polymer, and subjecting the mixture to thermal curing. A preferred non-film forming PVC latex useful in the practice of this invention is Vycar 351, produced by the B. F. Goodrich Company. Preferred water-soluble organic non-solvents include glycols of low volatility, a preferable species being glycerine.

The latex may be mixed with the non-solvent liquid by conventional techniques, low shear methods being preferable. It is preferred to add the non-solvent liquid slowly to the latex, rather than to add the latex to the non-solvent liquid. From 0.4 to 5 parts, by weight, of the non-solvent should be employed for each part of polymer contained in the latex. The mixture of latex and non-solvent liquid is essentially a colloidal dispersion of the polymer particles in the non-solvent liquid containing water derived from the latex. Mixtures containing the lower ranges of polymer content produce microporous PVC having higher pore volume, larger average pore size, and lower structural strength, by comparison with microporous PVC obtained from dispersions of higher polymer content.

To produce the composite rigid sponge structure of the present invention, the latex/non-solvent mixture is added to the cellulose sponge of the aforesaid nature in dry form, whereby the cellulose sponge absorbs the mixture. The amount of the mixture added is such as to be just short of producing gravity-induced run-off of the mixture from the cellulose sponge. To facilitate achievement of the proper saturation of the cellulose sponge, the impregnated sponge may be run through rollers to remove excess dispersion mixture.

The impregnated sponge is then subjected to heat treatment at temperatures in the range of 220 degrees F to 280 degrees F for a period of from 15 to 100 minutes. The effect of the heat treatment is to cause the dispersed polymer particles to cohere or sinter together, thereby forming a microporous structure within the pores of the cellulosic sponge. Greater degrees of sintering, produced by the more severe heating conditions, provides structures having reduced pore volume, smaller average pore size, and greater strength. If the heat treatment is insufficient, the microporous PVC will have too little strength to be retained within the cellulosic sponge.

It has been found that, if too much PVC is introduced into the cellulosic sponge, the macropore structure of the cellulose sponge becomes filled. This is undesirable because it causes the resultant composite sponge structure to develop an extremely high impedance to the passage of water in the course of a water-treating operation. It has accordingly been found that the upper limits on the amount of PVC introduced into the cellulosic sponge is five times the dry weight of the cellulosic sponge. When the amount of PVC incorporated into the cellulosic sponge is less than 100% or 1 time the dry weight of the cellulosic sponge, it has been found that the PVC flakes off the sponge, and the wet compressive strength of the composite sponge is very low.

The sintered PVC substrate produced by the present process is comprised of a multitudinous random array of interconnecting capillaries or interstices whose walls are composed of cohered particles of polymer which, under electron microscopic examination are seen to substantially retain their individual identities. The effect of the sintering step, therefore, is to cause the polymer particles to interadhere at their points of contact, as opposed to causing complete melting of the particles to a molten form with loss of particle identity and consequent reduced surface area. The average diameter of the pores or interstices may range from about 0.2 micron to 20 microns. The pore volume of the microporous PVC may range from 0.4 cc/gram for strongly sintered structures useful in bacterial filtration to 4.5 cc/gram for lightly sintered structures. The surface area of the microporous PVC may range from about 0.5 square meters/gram to about 12 square meters/gram. It may be noted in this connection that the total theoretical surface area of a polymer latex, namely, non-touching spheres of polyvinyl chloride of 0.2 micron diameter, is 21.4 square meters/gram. The microporous PVC substrate produced by the process of this invention, therefore, retains from about 5 percent to about 55 percent of the surface area of the starting material. This is essentially a measure of the degree of coherence of the microporous substrate. The relatively large surface areas are a result of the retention of individual particle identity referred to hereinabove. The physical characteristics of the microporous PVC substrate can be best measured by producing the substrate as a molded object in the absence of the cellulosic sponge but under the same conditions of dispersion dilution and thermal curing as would be employed in an intended composite sponge structure.

It is to be noted that the aforesaid procedure for producing the composite sponge of this invention differs from the procedure in U.S. Pat. No. 3,674,722 in that the water component of the dispersion mixture is not removed in a separate dehydration step prior to thermal curing. It is felt that the dry cellulose selectively removes the water from the dispersion mixture, thereby obviating the otherwise necessary dehydration of the mixture. This is an unexpectedly advantageous feature of employing a cellulosic sponge as the macropore component instead of other, non-water absorbing open-celled sponge or foam products.

The microporous PVC substrate may contain certain additives via incorporation in the dispersion prior to sintering. Such additives include fine clays; other polymers in latex or powder form such as polyvinyl acetate; polystyrene, and other addition and condensation polymers; activated charcoal; graphite; carbon black; reinforcing fibers; powdered metals; catalysts; pigments; stabilizers; plasticizers; bacteriostats; flavorants; odorants; and other species. A particularly preferred additive is sub-micron sized positively charged particles, such as "Alon" alumina aerogel, a product of the Cabot Corporation. Electrically conductive graphite is also of interest as a filler. The additive, when employed, usually will be present in an amount from about 0.3 percent to about 25 percent by weight of the PVC. Certain additives may be employed which, in conjunction with the fine pore structure of the PVC substrate cause the composite sponge structure to be useful in retaining microbial organisms useful in the bioremediation of polluted water. When iron powder, having an average particle size below 200 microns, is incorporated into the microporous PVC substrate, the resultant composite sponge structure is eminently suited for the reductive degradation of trichloroethylene and other volatile halocarbons that may exist in polluted water.

Although the utility of the composite porous structure of this invention has been described with respect to water filtration and treatment, other uses for the structure exist as, for example, air filtration, sound absorption and thermal insulation.

The following examples present illustrative but nonlimiting embodiments of the present invention. All parts and percentages are by weight unless otherwise noted.

EXAMPLE 1

A washed, dried sheet of OCelO cellulosic sponge of fine pore grade and ½" sheet thickness was cut into ½" cubes.

A dispersion mixture was made by slowly adding with rapid stirring 90 grams of anhydrous glycerine to 150 grams of Vycar 351 (B. F. Goodrich) having a 57.9% content of PVC. The resultant dispersion was added in its entirety to 34.7 grams of the aforesaid cellulose sponge cubes. The dispersion becomes completely absorbed by the cubes, without run-off. Some mixing and kneading of the cubes is done to achieve uniform distribution of the dispersion within the cubes.

The impregnated cubes are placed in a tray and entered into an oven initially at 212 degrees F. After 30 minutes, the oven temperature is elevated to 260 degrees F. The tray is removed after 40 minutes exposure to the 260 degree temperature. The cubes are washed with water to remove glycerine, then dried. The weight add-on of PVC is found to be 341%, or a weight ratio of PVC to cellulose of 3.41/1. The outer envelope or geometrical volumes of some of the dry composite porous structure cubes was accurately measured in conjunction with recordation of the corresponding weight of each cube. By assuming specific gravities of 1.4 for both cellulose and PVC, it is possible to calculate the total pore volume of the cubes, and such calculated pore volume is 88%. The expansion "total pore volume" is intended to denote the empty space volume of the structure which may be occupied by air or other fluid. By way of comparison, the similarly calculated total pore volume of the starting cellulosic sponge is 96%.

The cubes are placed in a water treatment column of 2" I.D. A test solution is prepared containing 10 ppm. each of a number of toxic organic compounds. The test solution is passed through the column of cubes at a rate so as to provide 10 minutes of residence time with the bed of cubes. The effluent, treated water was analyzed for said compounds. The results obtained are shown in Table 1.

TABLE 1

| Compound | % reduction |
| --- | --- |
| Methyl t-butyl ether | 37 |
| polynuclear aromatic hydrocarbons | 56 |
| polychlorinated biphenyls | 63 |
| trichlorethylene | 81 |
| pentachlorophenol | 49 |
| chlordane | 76 |

EXAMPLE 2

One pound of the composite rigid sponge structure cubes prepared in Example 1 was added to fifty gallons of river sediment sludge retrieved from the Hudson River in New York, and containing 29 pounds (dry weight basis) of sediment contaminated with 28 ppm of polychlorinated biphenyls (PCB).

The mixture was tumbled at 3 rpm in a concrete-type mixer for 24 hours at an ambient temperature of 78 degrees F. The mixture was poured through a ¼" mesh grate, which retained the sponge cubes and passed the sediment slurry. Analysis of the sediment material treated in such manner revealed a 72% reduction in PCB.

EXAMPLE 3

An OCelO sheet of Example 1 weighing 25 grams was treated in sheet form with a dispersion mixture comprised of 89 grams of glycerine and 176 grams of Vycar 351. The sheet completely absorbed the dispersion mixture, and was placed upon a rotating holder in an oven initially set at 212 degrees F. The rotation of the sheet prevented gravitational migration of the dispersion mixture out of the sheet and promoted uniform distribution of the dispersion mixture throughout the sheet.

The temperature was elevated to 260 degrees F, and maintained there for 60 minutes until curing of the dispersion mixture was complete. The sheet was removed from the oven, thoroughly washed with water to remove the glycerine, and dried. The resultant composite rigid sponge product, in sheet form, contains a PVC add-on of 407%, namely a ratio of PVC to cellulose of 4.07.

A circular specimen of 2 inch diameter was cut from the PVC-containing sheet and secured within a filter-holding device. An aqueous colloidal dispersion containing 0.2 micron particles was prepared merely by diluting a sample of the dispersion mixture employed in producing the composite sponge structure of this example. The colloidal dispersion was disposed in a tube directly over the filtration specimen, and the dispersion was allowed to flow through the filtration specimen under gravity force alone. It was found that the specimen was capable of filtering a considerable quantity of the colloidal dispersion without clogging or "blinding."

Another specimen was cut from the PVC-containing sheet of this example and subjected to a compression test in wet form. In a comparison test, a piece of the starting OCelO sponge was also tested in wet form. It was found that the force to achieve 50% compression of the OCelO sponge is 0.1 pounds/square centimeter, whereas the force to achieve 50% compression of the composite rigid sponge of this example is 20.0 pounds/square centimeter. This represents a 200-fold increase in compressive strength.

Of further interest is the fact that the starting OCelO sponge will swell about 25% in volume in going from a dry state to a wet state, whereas the composite rigid sponge structure of this invention undergoes less than 20% swelling in going from dry to wet state.

EXAMPLE 4

Di-2-ethylhexyldithiophosphoric acid (DEHDTPA) was dispersed in water with the aid of a non-ionic dispersing agent to form a 1% dispersion. Said dispersion was employed to treat the cubes of Example 1 disposed to a height of 30 inches in a column of three inch inside diameter. The cubes absorbed the DEHDTPA from the dispersion, causing the cubes to contain 18.4% by weight of DEHDTPA. The DEHDTPA, a known complexing agent for heavy metals, is thereby solvated or molecularly absorbed within the PVC substrate.

The cubes containing the DEHDTPA and still confined within the column, were then treated with an aqueous solution saturated with NaCl and containing 5 ppm each of $Cu^{++}$, $Cd^{++}$ and $Pb^{++}$ as the chlorides. The solution was caused to flow downwardly at a rate such as to permit 10 minutes of residence time within the column. The uppermost cubes in the column produced a sharply defined darkly colored absorption zone, and the effluent solution was found to have no detectable amounts of $Cu^{++}$, $Cd^{++}$ and $Pb^{++}$. Such results demonstrate the usefulness of the composite rigid sponge structure of the present invention as a selective absorbent for trace levels of toxic heavy metals in water.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A composite porous structure comprising:
   a) an open-pore sponge comprised of regenerated cellulose, and
   b) microporous polyvinyl chloride (PVC) deposited within said pores, the weight ratio of said PVC to said regenerated cellulose being between 5/1 and 1/1,
   c) the total volume of said pores being between 60% and 92% of the geometric volume of said structure, and
   d) the wet compressive strength of said structure being at least ten times greater than the wet compressive strength of said open-pore cellulose sponge without said PVC.

2. The composite porous structure of claim 1 having a six-sided cuboid configuration.

3. The composite porous structure of claim 1 containing a complexing agent for heavy metals.

4. The composite porous structure of claim 1 wherein said open-pore sponge of regenerated cellulose has an average pore size below 2 mm.

5. The composite porous structure of claim 4 wherein said pores consist of a random array of tunnels and apertures.

6. The composite porous structure of claim 1 wherein said microporous PVC is comprised of a multitudinous random array of interconnecting interstices having walls composed of cohered particles of polymer.

7. The composite porous structure of claim 6 wherein the average diameter of said interstices ranges between 0.2 and 20 microns.

8. The composite porous structure of claim 1 wherein the surface area of said microporous PVC is between 0.5 and 12 square meters per gram.

9. The composite porous structure of claim 1 which undergoes less than 20% of volumetric swelling when said structure, in dry form, is soaked in water.

10. A composite porous structure comprising:
   a) a macroporous open-celled sponge comprised of regenerated cellulose, and
   b) microporous polyvinylchloride (PVC) deposited within said macropores, the weight ratio of said PVC to said cellulose being between 5/1 and 1/1,
   c) the total empty space volume produced by the pores of said structure being between 80% and 92% of the outer geometrical volume of said structure, and
   d) the wet compressive strength of said structure is at least ten times greater than the wet compressive strength of said macroporous cellulose sponge without said PVC.

* * * * *